Jan. 18, 1955  J. P. ZALLEA  2,699,959
BELLOWS TYPE EXPANSION JOINT FOR TUBULAR CONDUITS
Original Filed Dec. 10, 1948  3 Sheets-Sheet 1
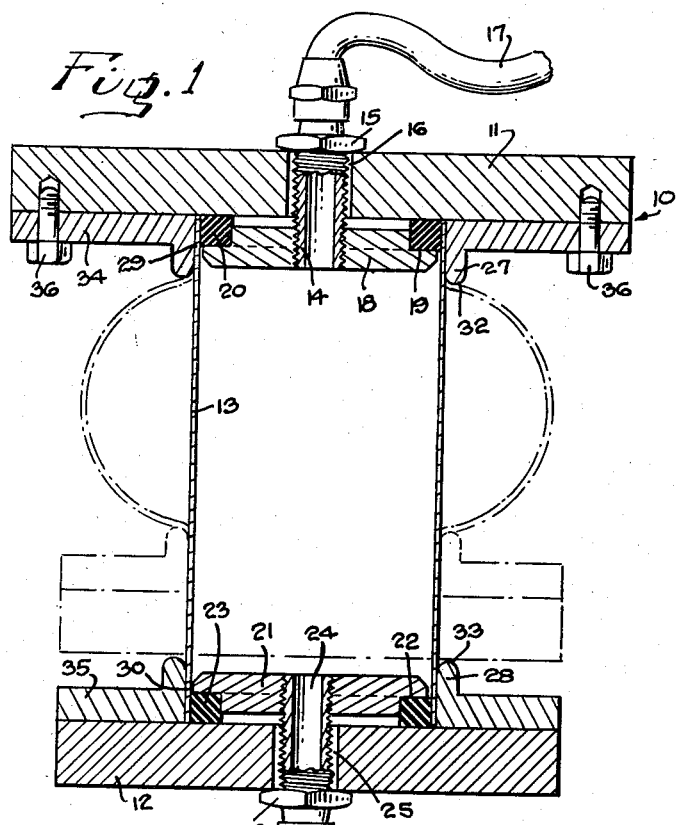
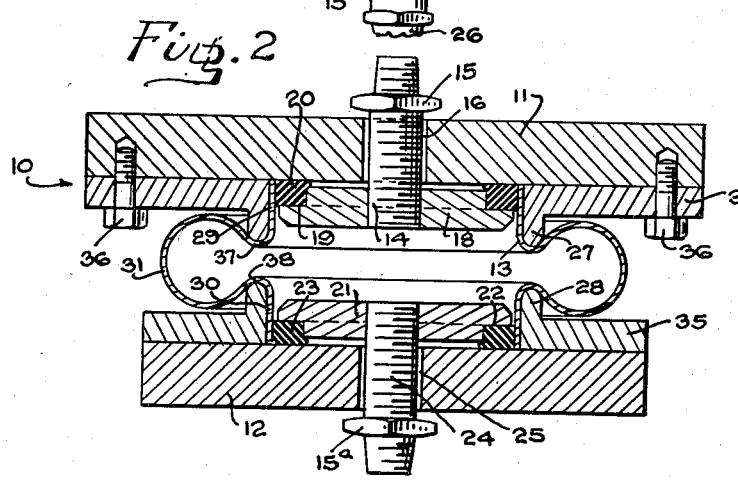
INVENTOR
JAMES P. ZALLEA
BY
ATTORNEY Jan. 18, 1955 J. P. ZALLEA 2,699,959
BELLOWS TYPE EXPANSION JOINT FOR TUBULAR CONDUITS
Original Filed Dec. 10, 1948 3 Sheets-Sheet 2
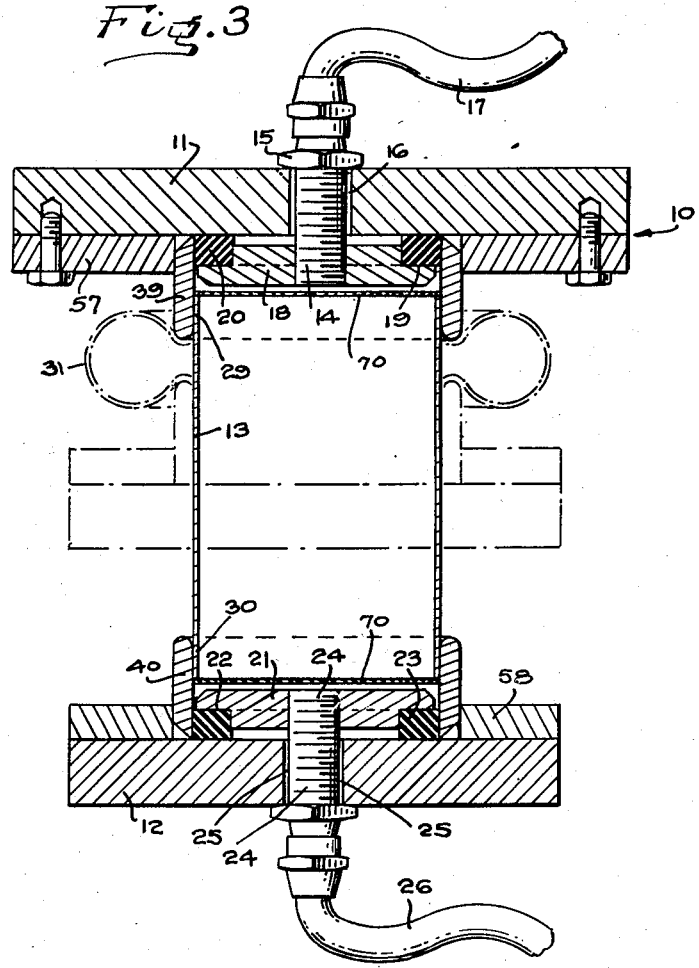
INVENTOR
JAMES P. ZALLEA
BY
ATTORNEY Jan. 18, 1955  J. P. ZALLEA  2,699,959
BELLOWS TYPE EXPANSION JOINT FOR TUBULAR CONDUITS
Original Filed Dec. 10, 1948  3 Sheets-Sheet 3
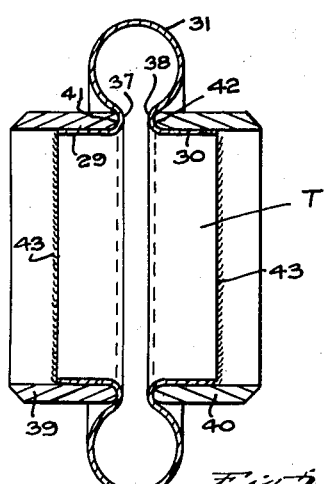
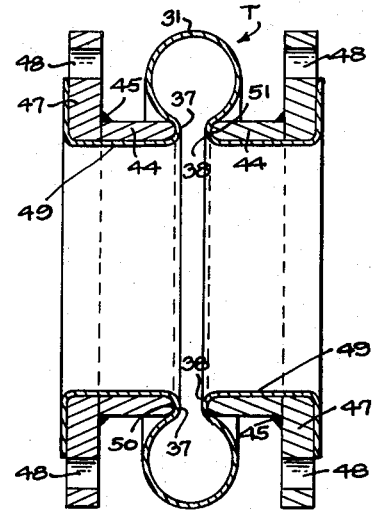
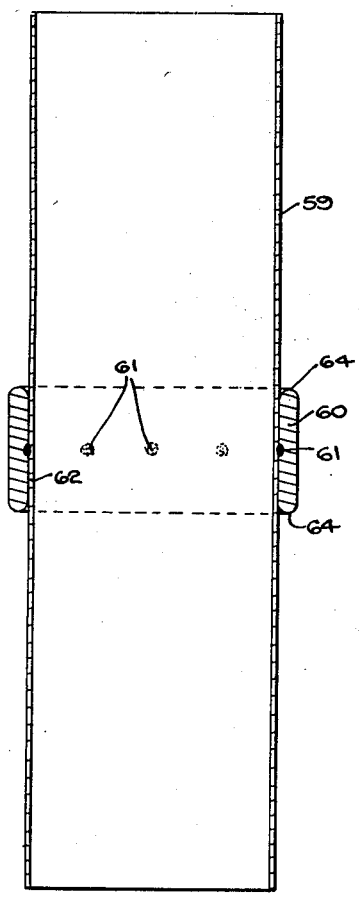
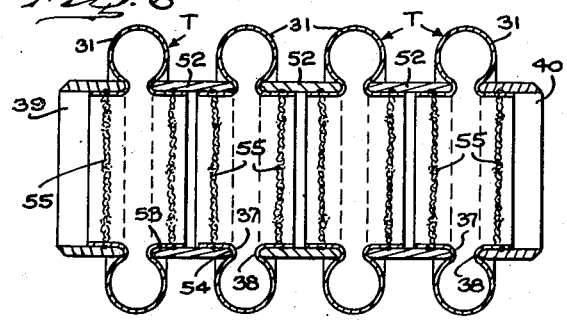
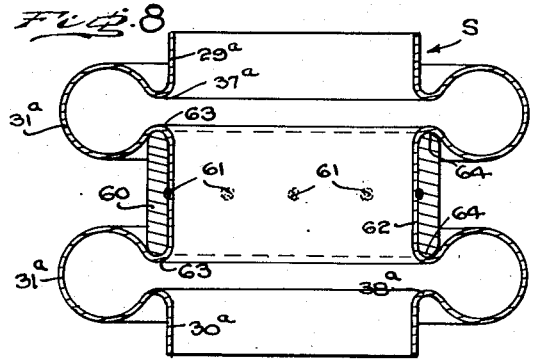
Inventor
JAMES P. ZALLEA
By
Attorney

United States Patent Office 2,699,959
Patented Jan. 18, 1955

2,699,959

BELLOWS TYPE EXPANSION JOINT FOR TUBULAR CONDUITS

James P. Zallea, Wilmington, Del.

Original application December 10, 1948, Serial No. 64,488. Divided and this application December 7, 1950, Serial No. 199,600

5 Claims. (Cl. 285—90)

This invention relates generally to expansion joints and more particularly to expansion joints having as a part thereof one-piece toroidal-shaped bellows elements and to the method of making the same, this application being a division of application Serial No. 64,488, filed December 10, 1948, now Patent No. 2,631,648.

It is a principal object of the present invention to provide expansion joints having thin-walled bellows elements which are capable of withstanding very high internal pressures, which are usable with the heavy gauge pipe necessary in a pipe line for such pressures and which permits a maximum of flexings before any failure due to material fatigue.

Also among the principal objects of the present invention is to provide a one-piece thin-walled hydraulically bulged bellows element capable of withstanding high internal pressures and a maximum number of flexings before failure due to material fatigue.

It is a further object of the present invention to provide toroidal-shaped bellows elements of one-piece construction which permits uniform flexing throughout the area of the bellows and which has no points of stress concentrations which would reduce the number of flexings before failure of the bellows due to material fatigue.

It is also an object of the invention to provide expansion joints with one or more one-piece hydraulically bulged toroidal-shaped bellows elements having integral tubular sections extending axially from opposite sides thereof, as well as to provide a simple and effective method of forming such bellows by hydraulic bulging of a tubular member without the use of any restraining dies.

With the above objects in view, the invention further resides in the combination and arrangements of parts and in the details of construction herein described and claimed; it being understood that the specific embodiments of the invention described herein are illustrative and that modifications thereof falling within the scope of the appended claims will be apparent to persons skilled in the art.

In the drawings:

Figure 1 is a sectional view of a portion of a conventional hydraulic press showing in full lines the upper and lower platens with a cylindrical bellows blank positioned therebetween, and in dotted lines an intermediate position of the platens and a partially formed bellows;

Figure 2 is a view similar to Figure 1 showing the lower platen in raised position with the toroidal-shaped bellows fully formed;

Figure 3 is a view similar to Figure 1 but showing a modified form of cylindrical bellows blank, the dotted lines showing the lower platen in raised position with the bellows fully formed;

Figure 4 is a sectional view of a bellows element formed in accordance with the present invention with pipe nipples encircling the integrally formed tubular sections of the bellows;

Figure 5 is a sectional view of a bellows element showing its integral oppositely extending tubular sections turned over flanges of an expansion joint adapted to be bolted to a pipe line or other equipment;

Figure 6 is a sectional view of a plurality of bellows elements welded to pipe nipples to form an expansion joint having a plurality of bellows;

Figure 7 is a sectional view of another modified form of cylindrical bellows blank having an encircling band midway thereof;

Figure 8 is a sectional view of a pair of integral toroidal-shaped bellows as made from the blank shown in Figure 7.

Heretofore toroidal-shaped bellows elements for expansion joints have been formed from a pair of like hollow hemitoroidal-shaped blanks having their outer circumferential edges butt-welded together. The inner circumferential edges of these butt-welded blanks, axially spaced from each other, were usually secured to axially extending pipe sections by edge or fillet welding. The prior art bellows unit so produced thus comprised four separate members which when welded together to form a composite unit, was subject to certain decided disadvantage inherent in the welded construction.

Inasmuch as it was necessary for successful butt-welding of the outer circumferential edges of the hemitoroid members of the bellows that the wall thickness or gauge of the metal used be not less than a prescribed minimum, such prior construction of the bellows element necessarily involved the use of metal of such thickness as reduced the flexibility of the bellows and its flexing capability to less than that of a bellows made of thin gauge material. Furthermore, because there is a limit to the gauge ratio between the metals respectively forming the hemitoroids and the pipe sections for successful welding together of these metals, when the pipe sections were of relatively heavy gauge, as when they were of large diameter or designed for use under high internal fluid pressure, the metal of which the hemitoroid members were formed were necessarily of relatively heavy gauge, thus limiting the flexing capability of the bellows element. Also, the weld-lines between the hemitoroid members and the pipe sections, being directly in the regions of flex, produced points of stress concentration resulting in reduced flexing capability of the bellows and premature destruction thereof.

In the present invention these disadvantages are overcome by the provision of a hydraulically bulged one-piece toroidal-shaped bellows element having integrally formed oppositely extending tubular pipe sections. By reason of the hydraulic bulging process of the present invention, not only may a bellows element be formed of the minimum gauge or wall thickness necessary to withstand a designated internal pressure, but also it insures that the toroidal-shaped portion of the element will be subject to uniform flexing throughout and will be capable of a maximum number of flexings before failure due to material fatigue. Due to the absence of any lines of weld within the one-piece toroidal-shaped portion of the bellows element there are no points of stress concentrations therein, thereby permitting uniform flexing throughout the bellows with no zones or areas of maximum or minimum flexing stress.

It is well known that for a given metal the thinner its gauge the greater the number of flexings is it capable of withstanding before material failure. By the process of the present invention, the bellows element may be formed of the minimum wall thickness required for a given internal pressure thereof to thereby increase its flexing capability and consequently its useful life.

For purposes of illustrating the principles underlying the present invention, the following practical examples may be given. Assuming the need for a corrugated expansion joint or bellows unit in a 30 inch diameter pipe line designed to withstand an internal pressure of 1000 pounds per square inch, the pipe line being formed of carbon steel and designed for a working stress of 11,000 pounds per square inch, the wall thickness of the pipe would be 1.36 inches according to the formula $$T_p = \frac{PR_p}{S}$$

wherein $T_p$ is the pipe wall thickness, $P$ is the working pressure, $R_p$ is the pipe line radius and $S$ is the permissible working strength of the carbon steel pipe. Employing in conjunction with such pipe line a stainless steel toroidal bellows having a circular section of 2½ inch diameter, the theoretical minimum wall thickness or gauge thereof should be 0.05 inch, according to the same formula $$T_t = \frac{PR_t}{S}$$

wherein $T_t$ is the toroid wall thickness, P is the working pressure, $R_t$ is the radius of the toroid circular section and S is the permissible working strength of the stainless steel toroid, i. e., 25,000 pounds per square inch.

For an internal working pressure of only 500 pounds per square inch in an expansion joint pipe line of the above specified diameters of pipe line and toroidal bellows, the wall thickness or gauge of the pipe line would be 0.681 inch, while that of the toroid would be 0.025 inch.

In either case, the gauge of the metal forming the toroid is too light for practicable butt welding together of two or more parts formed thereof, and it is because of this that welded toroidal elements have heretofore been formed of a gauge much heavier than that actually required to withstand a given internal operating pressure. The hydraulic bulging process of the present invention makes possible utilization of a wall thickness for the toroid which closely approaches the theoretical minimum for the metal of which it is formed when employed for a particular pipe line working pressure, at the same time that it permits formation of a toroidal bellows element having a materially increased working life, it being noted in this latter respect that when the toroid wall thickness is reduced one-half its life expectancy is increased approximately eight times.

In the hydraulic bulging method of forming the toroidal-shaped bellows, the cylindrical blank from which it is made is deformed from within without the use of any external restraining dies and as the opposite axially extending tubular sections are integral with the toroid-shaped portion of the bellows, they may be joined to suitable pipe nipples, spacer or supporting elements by suitable welds which are not in an area of flex and, therefore, not restrictive of the flexing life of the bellows. These tubular sections may be secured to embracing pipe elements by resistance seam welding, brazing or even soldering, thereby permitting practically any thickness of bellows metal to be welded to any thickness of pipe.

The present invention will be best understood by referring to the drawings, wherein Figures 1 and 2 show part of a conventional hydraulic press 10 having upper and lower platens 11 and 12, either of which may be movable relatively to the other, with a cylindrical shell or blank 13 therebetween from which the one-piece toroidal-shaped bellows element is made by hydraulic bulging on the press. A threaded nipple 14 having a nut 15 threaded thereon is adjustably supported in opening 16 of upper platen 11, the nut 15 being wider than opening 16. The nipple 14, with its vent conduit 17 suitably secured to its upper end, supports at its lower end a flat annular member 18 just below the platen 11 and inside the upper end of blank 13. An annular member 18, positioned with its upper face parallel to the lower face of platen 11, is threadedly secured to and supported by the lower end of nipple 14. Thus, the hydraulic pressure fluid, e. g., water, may flow from the interior of blank 13 to and through the vent conduit 17.

The annular member 18 of outside diameter slightly less than the internal diameter of blank 13 is circumferentially undercut on its upper face to provide an annular ledge or seat 19, the walls of which meet preferably at substantially right angles. Fitting snugly on the annular seat or ledge 19 in contact with the undersurface of platen 11 and the inside surface of that portion of blank 13 extending between the ledge 19 and platen 11 is a compressible sealing ring 20, of rubber or the like, which is adapted, when hydraulic pressure is exerted upon annular member 18, to be compressed to form a water-tight seal between the parts. It will be understood that the sealing ring 20, placed upon member 18 before the latter is threaded upon nipple 14, may be initially compressed after blank 13 is in place by manually or otherwise turning adjustable nut 15, whereupon further compression by hydraulic action on member 18 will form a water-tight seal at the upper confined end of the tubular blank.

A similarly shaped flat annular member 21 with an annular seat or ledge 22 is fitted with a compressible sealing ring 23 in contact with the inside surface of the lower end of blank 13 and with the upper surface of lower platen 12, so that when hydraulic pressure is exerted upon the upper surface of member 21, the sealing ring 23 may be compressed to form a water-tight seal between the parts. Annular member 21, spaced from platen 12 to allow for movement thereof in compressing the sealing ring 23, is also fitted with a conduit nipple 24, the latter being extended freely through a suitable opening 25 provided in the platen 12 and being connected to a conduit 26 for supplying fluid (e. g. water) under pressure into the interior of the tubular blank 13. As in the case of the upper nipple 14, the nipple 24 is also provided with a nut $15^a$ for preliminarily drawing the member 21 toward its platen 12 to compress the sealing ring 23 sufficiently to seal the lower end of the tubular blank 13. In accordance with conventional practice the conduit 26 may be provided with suitable valve means (not shown) for exhausting the fluid from the interior of the blank upon completion of the bulging operation of the present invention.

In order to form the toroidal-shaped portion of the bellows element by hydraulic bulging alone, dies in the form of encircling rings 27 and 28 are provided adjacent upper and lower portions of blank 13, those portions of the blank inside the rings forming the oppositely extending axially aligned tubular sections 29 and 30 (Figure 2) of the completed bellows element, while the portion of the blank between the rings forms the toroid-shaped portion 31 (Figure 2) thereof. It will be obvious that the size of the toroid 31 to be formed will depend upon the length of blank 13 extending between the ring dies 27 and 28.

It will be understood that ring dies 27 and 28 of such predetermined length may be employed as will insure that the completed toroid 31 will be spaced freely between the platen-supported members 34 and 35. The ring dies 27 and 28, with their free edges rounded, as at 32 and 33, may be formed as integral extensions of members 34 and 35 which are respectively mounted upon the upper and lower platens 11 and 12. Preferably, the upper member 34 is secured to the upper platen 11 in encircling relation with respect to tubular blank 13 by bolts 36 in threaded engagement with the marginal edge of the platen, while in the case of the lower member 35 its own weight is sufficient to hold it in position upon the lower platen 12 in encircling relation with respect to the tubular blank 13. However, if desired, the lower member 35 may also be bolted to its associated platen 12, in the same manner that the member 34 is bolted to the upper platen 11.

Suitably provided in the fill and drain connection 26 is a three-way valve (not shown) by means of which water under suitable pressure may be delivered into the interior of the tubular blank 13 when the bulging operation is commenced, or discharged therefrom when the bulging operation is completed. The vent connection 17 may be suitably provided with a closure valve (not shown) by means of which the blank 13 may be air-vented and by means of which a certain amount of water may be removed from within blank 13 from time to time as the platens 11 and 12 move toward each other and so compensate for the resulting reduction in the space therebetween during the bulging operation.

In the operation of the hydraulic press 10 with the blank 13 and ring dies 27 and 28 initially in the positions shown in full lines in Figure 1 and with the closure valve of vent 17 opened, a sufficient volume of water to fill blank 13 is delivered into the interior thereof by way of the passages 24 and 25 in communication with the main supply conduit 26, whereupon the valve in vent 17 is closed and pressure begins to be exerted upon the enclosed water from the pressure supply 26. With opposite circumferential edges of blank 13 in contact with platens 11 and 12, hydraulic pressure upon the flat annular members 18 and 21 will cause them to move slightly in opposite directions toward said platens, thereby compressing the sealing rings 20 and 23 to form a water-tight seal at each end of the blank 13. When the interior of the tubular blank 13 is thus subjected to hydraulic pressure, the movable platen, which may be either 11 or 12 but which is here shown as 12, is simultaneously raised toward the fixed platen, here shown as 11, and when the pressure exceeds the yield point of the metal of blank 13, the latter bulges outwardly centrally thereof into its uniformly curved (i. e., circular) form as shown in dotted lines in Figure 1.

It will be noted that the bulging operation is confined between the ring dies 27 and 28, the reversely curved portions 37 and 38 of the toroid which are formed as an incident to the bulging operation being shaped about the rounded free edges of the ring dies. The operator of the press continues to raise platen 12, apply pressure from connection 26, or remove water from within blank 13 by vent 17, as required, to continue the bulging process upon blank 13 until the center thereof has reached its desired outermost diameter. At this point, as shown in Figure 1, the curved section of blank 13 has not assumed its final circular form, this latter form of the bulged portion of the blank being obtained only after the relatively movable platens of the press assume their final positions as shown in Figure 2. It will be noted that as the metal of blank 13 is bulged outwardly it becomes progressively and uniformly thinner from a maximum thickness at the tubular sections 29 and 30 to a minimum thickness at the point of maximum diameter of the toroid section 31, this thinning being accompanied, however, by a compensating increase in the strength of the metal due to the cold working thereof. Because the hydraulic bulging process applies fluid pressure uniformly against the internal surface of the unconfined portion of the tubular blank 13, such portion is subject to substantially uniform deformation to provide a toroidal section having uniform strength throughout.

The present invention, by the process described, provides a one-piece toroidal-shaped bellows element T with integral oppositely extending axially aligned tubular sections 29 and 30, the toroidal-shaped portion 31 thereof being formed entirely by hydraulic bulging without the use of any restraining dies and being connected to each tubular section by the reversely curved portions 37 and 38 formed over ring dies 27 and 28. The entire flexing portion 31 of the bellows element is concave to pressure while the reversely extending portions 37 and 38, which will be adequately supported in the expansion joint by members of the same shape as ring dies 27 and 28, are convex to pressure.

For securing the bellows element T, formed as above described, in a pipe line, its tubular sections 29 and 30 are respectively provided with oppositely extending tubular members, such as the pipe nipples 39 and 40 shown in Figure 4. These pipe nipples 39 and 40 are respectively provided with rounded circumferential edges 41 and 42 which more or less snugly nest in the reversely curved portions 37 and 38 of each bellows element T, the nipples being secured to the tubular sections 29 and 30 by any convenient form of welding or brazing. In the case of extremely thin metal resistance seam welding is preferably employed, while with thicker metal the tubular sections 29 and 30 may be joined to pipe nipples 39 and 40 by lap welding, shown at 43—43 interiorly of the nipples. The outer free ends of the pipe nipples 39 and 40 are adapted to be welded or otherwies secured directly into a pipe line.

In one form of expansion joint, as shown in Figure 5, the supporting nipples for the bellows element are adapted to be bolted into the pipe line and to this end such nipples each include an axially extending member 44 having its outer free end welded, as at 45, to a bolting flange 47, the latter being suitably provided with bolt holes 48. The bolting flanges 47—47 encircle the extra long tubular sections 49—49 of bellows element T, the tubular sections extending beyond the flanges and being turned over the outer faces thereof to provide what is known as a Vanstoned construction. The rounded circumferential free edges 50 and 51 of pipe sections 44—44 snugly nest into the reversely curved portions 37 and 39 of the bellows element T, as in the previously described form of the bellows unit.

Figure 6 illustrates still another form of bellows unit constructed in accordance with the present invention. In this form of construction, a plurality of the bellows elements T are connected together in axially aligned relation by a series of interconnecting tubular sleeves 52, each of which is of a length at least equal to the combined lengths of a pair of the adjoining tubular extensions 29—30 of the bellows element. As in the case of the pipe nipples 39—40, in each of the connecting sleeves 52 the opposite ends thereof are rounded, as at 53 and 54, to snugly fit into the reversely curved portions 37—38 of the bellows elements. Any convenient or required number of axially aligned elements T may be joined together in this manner to form a multiple-bellows unit expansion joint. As illustrated in Figure 6, the multiple-bellows unit comprises four toroidal-shaped bellows elements T joined together by three connector sleeves 52, the oppositely extending tubular end sections 29 and 30 of the end elements having pipe nipples 39 and 40 secured thereto. In this embodiment, it is preferred that the tubular sections 29 and 30 of the bellows elements be secured to the sleeves 52 and to nipples 39 and 40 by resistance welding, each line 55 of which is formed of a series of overlapped spot welds to provide a fluid tight joint between the welded elements.

The expansion joint shown in Figure 4 as having been made by welding encircling pipe nipples 39 and 40 to the tubular sections 29 and 30 of a pre-formed toroidal-shaped bellows element may be constructed in another way. As illustrated in Figure 3, a blank 13 of cylindrical form with encircling pipe nipples 39 and 40 welded, as at 70—70, to opposite ends thereof may be positioned in the hydraulic press 10 between its platens 11 and 12 in a manner similar to that shown and described in Figure 1. Inasmuch as the blank from which the expansion joint of Figure 4 is to be formed comprises the cylindrical shell 13 and the nipples 39 and 40 welded to the ends thereof, the latter may be employed in themselves as the forming dies about which the bulging of the shell takes place. Thus, except for the fact that the nipples 39 and 40 replace the ring dies 27 and 28, the operation illustrated in Figure 3 is similar to that of Figure 1, the hydraulic press being modified only in that the annular members 57 and 58 thereof as employed in Figure 3 are centrally apertured to diameters sufficient to embrace the nipples 39 and 40.

It is within the scope of the present invention to provide a one-piece bellows element S having a pair of axially spaced toroidal sections 31a–31a as shown in Figure 8, such element being formed from a blanking member 59 as shown in Figure 7 by the hydraulic bulging process of the present invention. The blanking member 59 is similar to shell blank 13, except that it is longer and is provided with a centrally located encircling member 60 suitably welded thereto. This member 59 is positioned in the hydraulic press 10 in exactly the same manner as blank 13 with the exception that platens 11 and 12 are spaced the required distance apart to receive the longer blank. The embracing sleeve member 60 may be secured to the tubular shell 59 in any suitable manner, as by spot welds 61 or it may be free from the shell, in which case the sleeve 60 is supported centrally of blank shell 59 by any suitable external means until initial bulging of shell 59 above and below the sleeve member 60 operates to hold the same in place. In the present instance, guide die rings 27 and 28 and opposite rounded circumferential edges of the sleeve 60 are the means about which the axially aligned toroid-shaped portions 31a–31a are bulged in the hydraulic press 10, the reversely extending curved section 37a–38a being formed by the rounded edges of the ring dies 27 and 28. The double toroid-shaped portions 31a–31a of bellows element S are joined together by the intermediate tubular section 62 of the blank 59 embraced by the sleeve member 60 the opposite ends of which fit into the reversely curved sections 63—63 of the shell, the latter sections being respectively formed by the opposite rounded ends 64-64 of the sleeve 60. Tubular sections 29a and 30a axially aligned with each other and with tubular section 62 are integrally formed with the toroid-shaped sections 31a–31a and extend in opposite directions from the outer sides of each, being respectively joined thereto by the outer reverse curved sections 37a and 38a. In order to support the double toroid element S for use in a pipe line, pipe nipples similar to those designated by the reference numerals 39 and 40 in Figure 4 may be secured to the tubular end sections 29a and 30a of the bellows by welding, brazing or the like.

It will be apparent that by securing a plurality of sleeve members 60 to the member 59 in suitably spaced relation, a one-piece bellows element having a plurality of axially spaced toroidal elements may be formed in a single hydraulic bulging operation, the number of such toroidal elements exceeding by one the number of intermediate sleeve members 60 preliminarily secured to the tube 59. Thus, instead of forming a bellows element with only two toroidal elements as in Figure 8, a bellows element may be formed with three or any greater number of such toroidal elements.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. In an expansion joint for a pipe line or the like, a unitary bellows element of hollow toroidal shape formed of a tubular blank to have permanently formed an annular central wall part of generally circular shape in transverse section which is concave to any internal pressure to which the joint may be subjected, said annular central wall part being transversely curved through an arc substantially greater than 180 degrees and terminating at opposite sides thereof in a pair of axially spaced annular side wall parts which define therebetween a relatively narrow opening extending circumferentially about the annular base of said central wall part, said side wall parts being each similarly curved reversely throughout with respect to the curvature of said central part and thus convex to said internal pressure, the reversely curved side wall parts providing respectively on opposite sides of the central wall part of the bellows element a pair of oppositely presenting annular indentations equally spaced radially from the central longitudinal axis of the bellows element, the said indentations being each of a same radius substantially less than that of the central wall part, the opposite sides of said annular central wall part of the bellows element and said reversely curved side wall parts thereof being symmetrically disposed with reference to the median plane of the element extending normal to the axis thereof, said reversely curved side wall parts being respectively provided with axially alined tubular extremities of equal diameter at opposite sides of said main central wall part, means snugly fitted in the indentations formed by said reversely curved side wall parts of said bellows element and extending axially from opposite sides thereof in embracing relation to said tubular extremities for reinforcing and supporting said side wall parts against deformation under the influence of said internal pressure, while permitting said central part to flex freely upon expansion and contraction of said joint, and means for securing said reinforcing and supporting means respectively to said tubular extensions, said securing means being spaced axially from said reversely curved side wall parts, said bellows element being further characterized in that the transversely curved central wall part and the reversely curved side wall parts thereof are formed of continuously homogeneous metal entirely free of any circumferentially extending welds.

2. In an expansion joint for a pipe line or the like, a bellows element as defined in claim 1 wherein said means for supporting said reversely curved side wall parts against deformation under the influence of said internal pressure comprise oppositely extending tubular members secured to said bellows element in axial extension thereof, the ends of said tubular members respectively adjoining opposite sides of said bellows element being rounded to a shape which is complemental to the transverse curvature of said annular indentations and being snugly nested in said indentations.

3. In an expansion joint as defined in claim 1 wherein the means for securing the reinforcing and supporting means to the tubular extensions of the bellows element are welds disposed along lines extending circumferentially about said tubular extensions, all of said welds being spaced axially from said reversely curved side wall parts of the bellows element.

4. In an expansion joint for a pipe line or the like, a plurality of hollow toroid-shaped unitary bellows elements formed of tubular stock so that each of said elements has permanently formed an annular central wall part of generally circular form which extends in transverse section through an arc substantially greater than 180 degrees and terminates at opposite sides thereof in a pair of axially spaced oppositely disposed annular side wall parts which in transverse section are curved reversely throughout with respect to the curvature of said main central wall part to define therebetween a relatively narrow opening extending circumferentially about the annular base of said main central wall part, all said parts of each bellows element being symmetrically disposed in relation to the median plane of the element extending normal to the axis thereof, the main central wall part of each bellows element being concave to said internal pressure while the reversely curved side wall parts thereof are convex to said pressure, the reversely curved side wall parts providing respectively on opposite sides of the central wall part of the bellows element a pair of oppositely presenting annular indentations equally spaced radially from the central longitudinal axis of the bellows element, the said indentations being each of a same radius substantially less than that of the central wall part, said reversely curved side wall parts being respectively provided with axially alined tubular extremities of equal diameter at opposite sides of said main central wall part, and a plurality of tubular sleeves disposed alternately with respect to said bellows elements in coaxial alinement therewith, each adjoining pair of said bellows elements having one of said sleeves extending therebetween to commonly embrace the proximate tubular extremities of each said adjoining pair of bellows elements, the ends of said sleeves in immediate proximity to said bellows elements having edges which are shaped complementally to the transverse curvature of said indentations and are snugly accommodated therein, said sleeves being adapted to support the reversely curved side wall parts of the bellows elements against deformation under the influence of said internal pressure and to permit freedom of movement of the main central wall parts of the bellows elements when the latter are alternately expanded and contracted, and means for securely retaining in each of said indentations the complementally shaped end of the sleeve snugly accommodated therein, said securing means being in each instance spaced axially from said reversely curved side wall parts, each of said bellows elements being further characterized in that the transversely curved main central wall part and the reversely curved side wall parts thereof are formed of continuously homogeneous metal entirely free of any circumferentially extending welds.

5. In an expansion joint as defined in claim 4 wherein the aforesaid proximate tubular extremities of each adjoining pair of said bellows elements are in the form of a cylindrical part which extends continuously between and is commonly integral with said adjoining pair of said bellows elements.

References Cited in the file of this patent

UNITED STATES PATENTS

| Number | Name | Date |
|---|---|---|
| 327,215 | Youngs | Sept. 29, 1885 |
| 1,239,978 | Star | Sept. 11, 1917 |
| 2,208,539 | Brown | July 16, 1940 |
| 2,298,150 | Newton | Oct. 16, 1942 |
| 2,418,800 | Wilson | Apr. 8, 1947 |
| 2,445,484 | Kopperman | July 20, 1948 |
| 2,489,844 | Zallea | Nov. 29, 1949 |

FOREIGN PATENTS

| Number | Country | Date |
|---|---|---|
| 191,911 | Switzerland | Dec. 1, 1937 |
| 498,403 | Great Britain | Jan. 9, 1939 |